United States Patent [19]

Maeurer et al.

[11] Patent Number: 5,301,323
[45] Date of Patent: Apr. 5, 1994

[54] DATA PROCESSING SYSTEM INCLUDING DYNAMIC CHANNEL PATH MANAGEMENT

[75] Inventors: Theodore R. Maeurer; Allan S. Meritt, both of Poughkeepsie, N.Y.

[73] Assignee: International Business Machines Corp., Armonk, N.Y.

[21] Appl. No.: 968,704

[22] Filed: Oct. 30, 1992

[51] Int. Cl.$^5$ .......................................... G06F 13/00
[52] U.S. Cl. ............................... 395/650; 364/DIG. 1; 364/238.2; 364/238.3
[58] Field of Search ................. 395/650; 364/DIG. 1, 364/238.2, 238.3

[56] References Cited

U.S. PATENT DOCUMENTS

| | | | |
|---|---|---|---|
| 5,170,472 | 12/1992 | Cwiakala et al. | 395/275 |
| 5,197,069 | 3/1993 | Cook et al. | 371/7 |
| 5,220,654 | 6/1993 | Benson et al. | 395/275 |
| 5,257,379 | 10/1993 | Cwiakala et al. | 395/700 |

OTHER PUBLICATIONS

Ouyang, Y. C. et al, "Neural Network based routing in Computer Communicaton Network", IEEE Int. Conf. on Systems Eng. 1990, pp. 621-624.

*Primary Examiner*—Gareth D. Shaw
*Assistant Examiner*—A. Katbab
*Attorney, Agent, or Firm*—William B. Porter; Douglas R. McKechnie

[57] ABSTRACT

A large data processing system includes a channel path management program that is periodically executed during operation of the system to gather control unit and subchannel utilization statistics and to monitor such statistics. If the degree of utilization of a channel path or an I/O device exceeds a predetermined threshold value, one or more change(s) is(are) dynamically made in the channel path configuration.

23 Claims, 3 Drawing Sheets

DATA PROCESSING SYSTEM INCLUDING DYNAMIC CHANNEL PATH MANAGEMENT

RELATED APPLICATIONS (1) Application Ser. No. 07/676,603, filed Mar. 28, 1991, for "METHOD AND APPARATUS FOR DYNAMIC CHANGES TO SYSTEM I/O CONFIGURATION", by S. M. Benson et al, now U.S. Pat. No. 5,257,368.

(2) Application Ser. No. 07/693,997, filed Mar. 28, 1991, for "DYNAMICALLY CHANGING A SYSTEM I/O CONFIGURATION DEFINITION", by R. Cwiakala et al, now U.S. Pat. No. 5,170,472.

Each related application is assigned to the assignee of this invention and is hereby incorporated herein by reference.

BACKGROUND OF THE INVENTION

This invention relates to the field of data processing, and, more particularly, to an improved data processing system having means for dynamically managing channel paths while the data processing system is running.

Large computing systems are commercially available which are constructed in accordance with the IBM Enterprise Systems Architecture ESA/390 and operate under IBM multiple virtual storage (MVS) operating system. Such architecture is described in the publication "ENTERPRISE SYSTEMS ARCHITECTURE/390, PRINCIPLES OF OPERATION", form SA22-7201-0, published by IBM Corporation, copyright 1990,1991. This publication is hereby incorporated herein by reference and may be referred to for details not described in this specification.

ESA/390 systems generally comprise one or more central processing units (CPUs), operator facilities, a channel subsystem, and input/output (I/O) devices, the latter being connected to the channel subsystem through control units. The connections between the channel subsystem and the control units are referred to as channel paths. The channel paths may extend through and be routed by switches. An "I/O configuration" comprises channel paths, control units, I/O devices, and their connections including any switches.

A channel subsystem directs the flow of information between I/O devices and main storage. The channel subsystem uses one or more channel paths as the communication link in managing the flow of information to and from I/O devices. As part of I/O processing, the channel subsystem also performs a path management function of testing for channel path availability, selecting an available channel path, and initiating execution of the operation with an I/O device. The channel subsystem also includes subchannels, there being one subchannel for each I/O device. Each subchannel is dedicated to an I/O device and stores information controlling operation of such device.

Multiple I/O devices may be attached to a single control unit. Multiple control units may be attached to a single channel path. Control units may be attached to a channel subsystem by more than one channel path, and an I/O device may be attached to more than one control unit. An individual I/O device may be accessible to the channel subsystem through as many as eight different channel paths. A dynamic switch can be connected to either the same or different channel subsystems and to multiple control units. There thus exists numerous choices and variations concerning how a particular system may be configured.

The physical equipment is referred to as the "installation". A device is considered "installed" when it is mechanically and electrically connected into the system. However, the mere fact that a device is installed does not mean that it is configured into the system. As the term is used herein, "configuration" means not only the physical connections but also the channel subsystem and software settings and information which allow the equipment to be operated under the control of the operating system.

In operation, an ESA/390 data processing system typically runs a variety of workloads. Each workload performs best when the I/O configuration is tailored to meet the needs of such workload. The act of defining an optimal I/O configuration is costly and requires a great deal of system programmer's time and skills. The resulting I/O configuration may in fact be a best guess rather that an optimal solution. Additional complications arise from the fact than any single workload has variations both in time and in nature. Furthermore, most installations do not run a single workload. Various workloads may be run throughout the day placing different requirements on the computing resources. For example, short transactions may be most prevalent during midday while long running backups may be run at night thus producing different mixes of workloads. It is likely that some workload changes are more frequent than changes in work shift. The requirements of different workloads tend to conflict thereby complicating the act of defining the best I/O configuration.

I/O configuration definitions are commonly made by a system programmer who analyzes customer workloads and device and channel path utilizations. A configuration is selected which handles a typical workload, and various I/O devices are installed and initialized. In the past, once the I/O configuration was defined and installed, it was fixed and could not be changed except by repeating the process. To improve upon such process, a dynamic I/O configuration change facility was developed which allows an installation to be more easily changed to new I/O configurations. Such facility is disclosed in the above-identified related applications. Typically, in accordance with such facility, a system programmer defines various I/O configurations that can be used to support different workloads. This allows a system programmer to specify a best guess I/O configuration for a period of time given prior knowledge of the workload. The problem still remains that a system programmer must define an I/O configuration for each particular workload or group of workloads. The human involvement of a system programmer precludes making frequent adjustments especially when the workload is unpredictable, and it still requires skills and preplanning. The effort required to plan an I/O configuration when enhancing capacity is similar to that needed to run different workloads. Bottlenecks and shortages must be identified. New I/O devices may be necessary. Analysis must be performed to determine how the I/O configuration is to be modified to remove bottlenecks and make efficient use of additional I/O devices.

In summary, I/O configuration definitions are customarily made by system programmers using their skills and judgements, which may be aided by making observations and measurements of system operations and analyzing the results. Such definitions are made when a system is initially configured and when changes are made to add, delete or modify existing installations. The invention is designed to reduce the degree of system programmer involvement by managing and automatically reconfiguring channel path assignment in the I/O configuration in accordance with changes in the system workload.

The general idea of measuring some form of system workload and managing some system resources, is not new. U.S. Pat. No. 3,702,006- J. B. Page discloses a "METHOD FOR BALANCING THE UTILIZATION OF INPUT/OUTPUT DEVICES" in which measurements are made of I/O utilization for current tasks, and a data set is allocated to an I/O device based on least I/O device utilization as determined from the measurements. The patented invention attempts to select a device on which to place a new dataset in anticipation of an activity. The patented invention differs from the present invention in a number of ways. It does not alter the system configuration in any manner. Once a selection is made, the binding of the data set to a device is static. The mechanism described in the patent cannot do anything if its anticipatory allocation is incorrect, i.e., if the activity placed on the newly allocated dataset is higher than anticipated in which case performance will be degraded. Furthermore, the patented invention applies only to certain device types, namely direct access storage devices (DASD). Additionally, it only applies to a subset of operations, namely allocation of new datasets. When a dataset being allocated already exists, it can only be allocated on the device on which it already has been placed. Thus, the mechanisms described do not apply and no balancing occurs for the usage of devices other than DASD or for pre-existing data sets, and the mechanisms are static and cannot react to incorrect anticipatory decisions. The present invention supports all device types and also supports both new datasets and preexisting datasets. The subject invention processes by reacting to dynamically changing activity and altering the I/O configuration accordingly to provide balancing and additional channel bandwidth capability to those control units which require it at any instant. Thus, anticipatory decisions made by the present invention are not permanent and can adjust to incorrect anticipation.

SUMMARY OF THE INVENTION

One of the objects of the invention is to provide an improved method and apparatus for channel path management by dynamically changing channel path configuration in accordance with varying system workload.

Another object of the invention is to dynamically manage channel paths to I/O devices by monitoring or measuring I/O workload and changing the I/O configuration while the system is operating, to maximize I/O performance according to some set of priorities, e.g. workload goals or system performance.

A further object of the invention is to minimize the degree of system programmer involvement necessary to define an I/O configuration, by allowing the system to automatically change the I/O configuration in accordance with changes in the system workload.

Still another object of the invention is to reduce the hardware required in an installation by more efficiently using the installed hardware and adjusting the configuration to accommodate the workload.

Briefly, in accordance with the invention, a dynamic channel path management program is periodically executed to gather system performance or workload statistics, to monitor such statistics, and to dynamically change channel path configuration.

DRAWINGS

Other objects and advantages of the invention will be apparent from the following description taken in connection with the accompanying drawings wherein.

DETAILED DESCRIPTION

SYSTEM OVERVIEW

Figure 1:
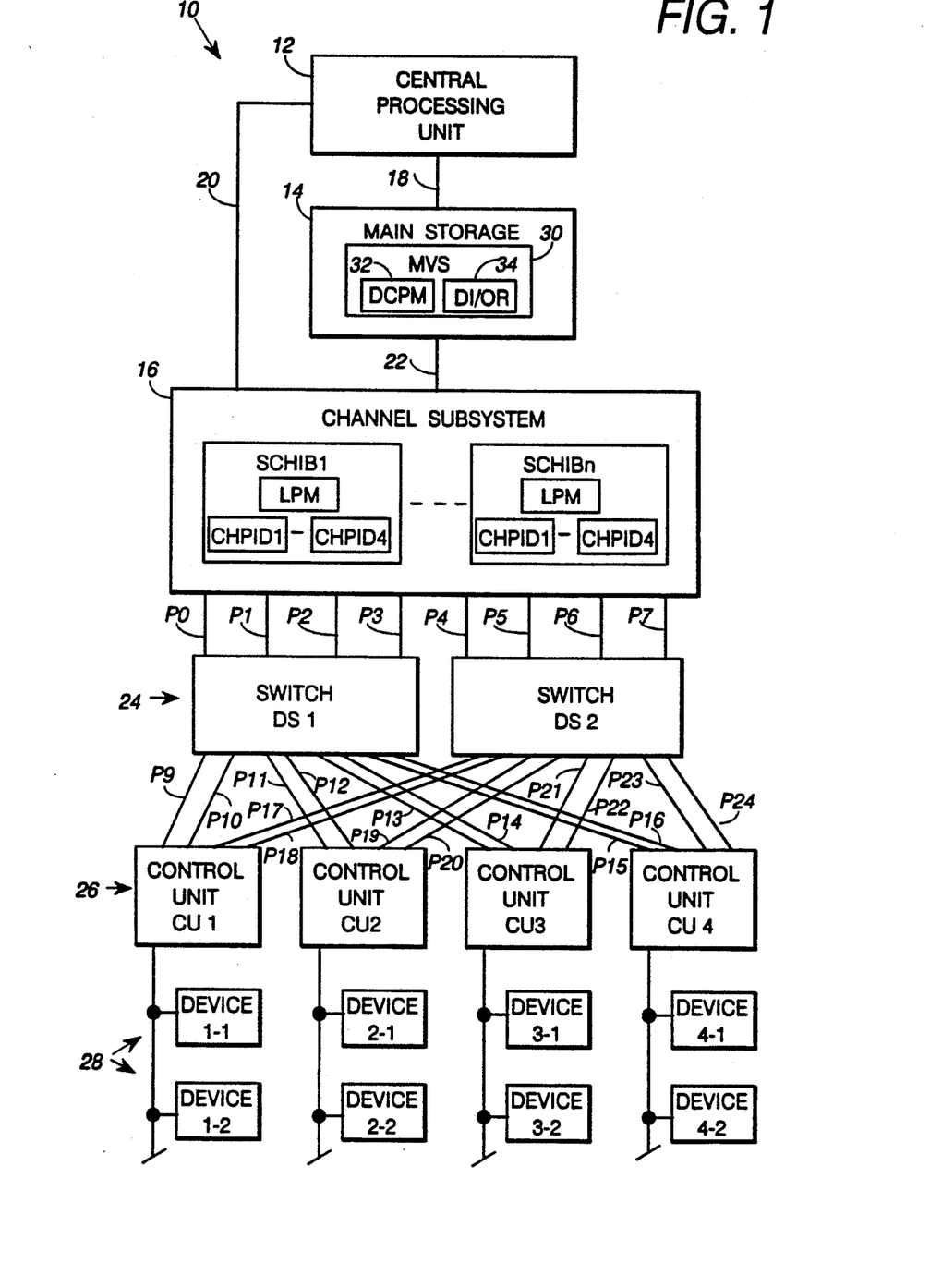
FIG. 1 is a block diagram of a data processing system embodying the invention.

Referring now to the drawings, and first to FIG. 1, there is shown an exemplary ESA/390 data processing system (DPS) 10 having a central processing unit (CPU) 12 coupled to a main storage 14 and to a channel subsystem (CSS) 16. CPU 12 directly accesses main storage 14 over bus 18 and initiates I/O operations in CSS 16 by transmitting I/O instructions to the channel subsystem over bus 20. Information (including channel programs) is transferred between main storage 14 and CSS 16 over bus 22. DPS 10 further comprises a plurality of dynamic switches 24 connected between CSS 16 and a plurality of control units 26. A plurality of I/O devices 28 are connected to control units 26 via serial I/O interfaces. Such switches and control units are respectively designated DS1, DS2, and CU1-CU4 in FIG. 1.

Stored in main storage 14 for execution by CPU 12 are a plurality of programs including MVS operating system 30 and application programs (not shown). MVS 30 comprises a dynamic I/O reconfiguration program (DI/OR) 34 and a dynamic channel path manager (DCPM) program 32 the general functions and operation of which are described below relative to FIG. 2. Except for DCPM 32, the remaining elements of the system are constructed and operated in accordance with the prior art, and the invention involves the operation of DCPM 32 and its interaction with the remaining elements.

CSS 16 directs the flow of information between the I/O devices 28 and main storage 14 and relieves the CPU of the task of communicating directly with I/O devices thus allowing concurrent CPU processing and I/O processing. Each I/O device is associated with a different subchannel that provides to the CPU the logical appearance of an I/O device. Each subchannel includes a standard subchannel information block (SCHIB) stored in CSS 16. The number of subchannels and SCHIBs is equal to the number of I/O devices, there being one subchannel and one SCHIB for each device. Included in each SCHIB are a plurality of fields for storing a plurality of channel path identifiers (CHPIDn) which identify the channel paths by which the associated device can be accessed. A CHPID number or identifier is an eight bit binary number that uniquely identifies up to 256 channel paths. "CHPID" is used hereinafter to refer to a channel path and "CHIPID number" refers to the channel path identifier. Also included in each SCHIB is a logical path mask (LPM) that contains a plurality of bits, there being a different bit for each CHPID. The LPM bits indicate the logical availability of channel paths to the associated device. A bit set to one means the corresponding channel path is logically available to the I/O device, and a bit set to zero means the corresponding channel path is not logically available.

Switches 24 have a plurality of ports each connected to a different path. CSS 16 is connected to switch DS1 by a plurality of paths P0-P3 and to switch DS2 by a plurality of paths P4-P7. Switch DS1 is connected to control units CU1-CU4 by paths P9-P16, there being two paths from switch DS1 to each control unit forming a serial I/O interface. Obviously, other interfaces could be used. Switch DS2 is connected to control units CU1-CU4 by paths P17-P24, there being two paths from switch DS2 to each control unit. Switches DS1 and DS2 are respectively operable under program control to route and connect any one of paths P0-P3 to any one of paths P9-P16 and any one of paths P4-P7 to any one of paths P17-P24, to thereby create multiple channel paths that extend between CSS 16 and each control unit and the I/O devices connected to such control unit, the channel paths extending through the switches.

Figure 3:
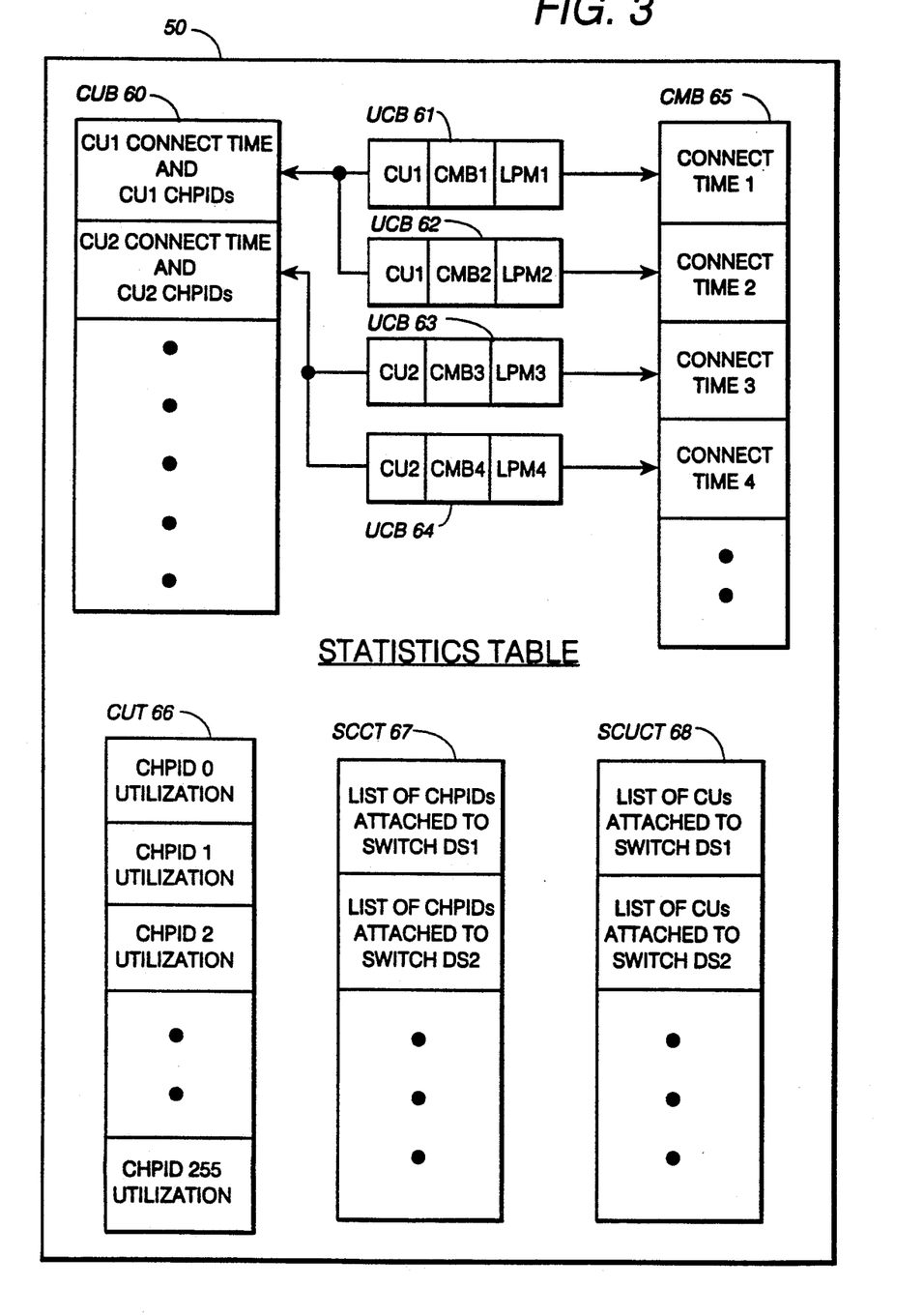
FIG. 3 is a block diagram illustrating details of the statistics table shown in FIG. 2.

In accordance with ESA/390, each subchannel can be configured with up to eight channel paths, but, for purposes of simplification, each subchannel is assumed to be connectable to four channel paths. Thus, each SCHIB has four fields CHPID1-CHPID4 for storing up to four CHPID numbers. As illustrated, however, there are sixteen different potential paths from CSS 16 to each control unit. At I/O definition time, only four paths can be assigned and configured to each subchannel leaving twelve other paths that can be reconfigured in the manner described below. By way of example, SCHIB1 may have configured to it four CHPIDs consisting of P0-DS1-P9, P1-DS1-P10, P4-DS2-P17, and P7-DS2-P18. A CHPID is considered "configured" when the proper binding has been setup in CSS 16 either through dynamic I/O reconfiguration or by IP-Ling the system. The CHPIDs which are currently configured to each control unit are listed in CUB 60 (FIG. 3).

CHANNEL PATH MANAGEMENT

Figure 2:
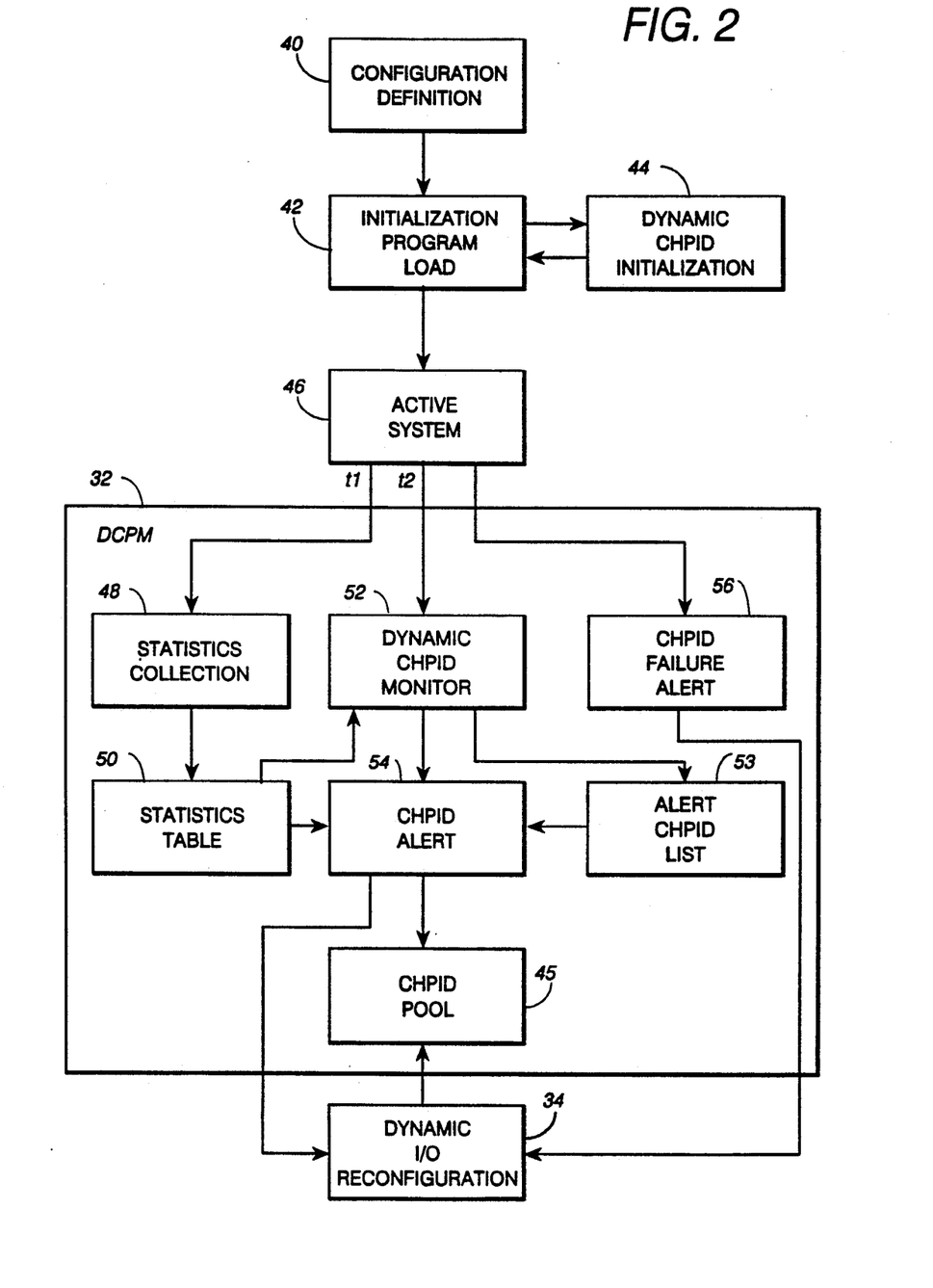
FIG. 2 is a flow chart of general operations that occur while operating the data processing system shown in FIG. 1, in accordance with, the invention.

Referring to FIG. 2, prior to system initial program load (IPL) 42, a configuration definition is made at 40 in the same general manner as it is done in the prior art except that the analysis may be reduced because of the dynamic channel path management that occurs when the system becomes active. The configuration definition establishes the initial I/O configuration for the DPS and thus defines which CHPIDs are currently configured. After step 40, system IPL step 42 is performed as it is done in prior art except that dynamic CHPID initialization 44 occurs in addition to the normal IPL functions. During dynamic CHPID initialization 44, control unit-to-switch connections and channel subsystem-to-switch connections are determined for later use in deciding which channel paths can be configured to each control unit and what devices can be connected to each control unit. A statistics table 50 and an alert CHPID list 53 are initialized. Also, a CHPID pool 45 is created which contains a set of CHPID numbers that identify a set of channel paths that can be potentially configured to each control unit. In other words, CHPID pool 45 contains a plurality of control unit CHPID pools each of which identifies the CHPIDs that are potentially configurable to a control unit. The CHPID pools for the control units are constructed from the SCCT and SCUCT tables described below. At the completion of step 42, including step 44, the system thus contains CHPIDs for each control unit which are currently configured in the I/O configuration and CHPIDs that while not yet configured, are potentially configurable.

After IPL step 42, the system becomes active at 46 and normal data processing operations are performed under the control of MVS operating system 30. Such operating system is a multitasking system and during the operation thereof at periodic intervals, dynamic channel path management routines 32 are performed as separate tasks. A statistics collection routine 48 is executed every t1 seconds to maintain statistics table 50 and store therein information on total CHPID utilization and control unit connect time. "Connect time" is the time that a control unit communicates with the channel subsystem. Control unit connect time (from table 60) serves as a measure of CHPID utilization attributed to a control unit. A dynamic CHPID monitor routine 52 is executed every t2 seconds to examine the information in table 50 and perform dynamic reconfiguration as necessary, in the manner described in detail below.

Before proceeding further with other details, it might better aid the understanding of the invention to explain at this point details of table 50. Referring to FIG. 3, statistics table 50 is a data structure containing a plurality of control blocks 60-65, and a plurality of tables 66-68. A plurality of unit control blocks (UCBs) 61-64 are created or defined through configuration definition process 40 (FIG. 2), there being one UCB for each I/O device and subchannel. Included in each UCBn are a first field containing a pointer CUn to a control unit entry in table 60, a second field containing a pointer CMBn to a separate entry in a channel measurement block (CMB) 65, and a third field containing a copy of the logical path mask LPM associated with the I/O device. Shown in the diagram are only pertinent subfields within conventional unit control blocks created by the operating system. Each entry in CMB 65 accumulates the connect time when the associated I/O device is connected to a channel path. The means for accumulating such data is well known in the prior art and can be done by the channel measurement facility described in the above mentioned ESA/390 publication.

Block 60 is a control unit block (CUB) that contains a plurality of entries, there being a different entry for each control unit. Each entry contains a field for accumulating from statistics collection routine 48 the connect times from CMB 65 for all CHPIDs attached to the control unit. The connect time for each entry is accumulated by adding the connect times from the CMB entries for all I/O devices attached to the control unit. Also contained in each entry is a list of all CHPIDs to which the control unit is currently configured. Each UCB is associated with a control unit and hence with an entry in the CUB. Multiple UCBs may be associated with the same CUB entry since a control unit may support multiple devices. The determination of the association of devices to control units is done in accordance with the prior art. In an example shown in FIG. 3, there are two UCBs 61 and 62 both associated with control unit CU1 so that the entry CU1 CONNECT TIME accumulates the connect times from CMB entries 1 and 2. The other entries can be similarly interpreted. The connect time in CUB 60 for a control unit, divided by the number of CHPIDs to which the control unit is currently configured, (in the CUB entry for that control unit) is used as a measure of the utilization that such control unit places on each CHPID to which it is configured. The information is used to determine which control units need to be reconfigured.

Table 66 is a CHPID utilization table (CUT) that contains the utilization of each channel path installed in the system, the utilization being expressed as CHPID connect time. Entries exist for both installed channel paths and for non-installed channel paths, the latter entries being "0" indicating no utilization. This table is indexed by CHPID numbers. The means for accumulating such data is well known in the art. ESA/390 has a STCPS instruction that can be used. Further, system activity display information from a processor controller can also be used.

Table 67 is a switch-to-CHPID correspondence table (SCCT) that contains an entry for each switch in the I/O configuration. Each entry contains the set of channel paths that are attached to that switch. Since a channel path may be attached to only a single switch, the same CHPID appears in only one entry of SCCT 67. Table 68 is a switch-to-control unit correspondence table (SCUCT) that contains an entry for each switch in the I/O configuration. Each entry contains the set of control units attached to that switch. Since a control unit may be attached to multiple switches, the same control unit may appear in more than one entry of SCUCT 68.

Tables 67 and 68 are used to construct a CHPID pool for each control unit. Such pool is constructed for a control unit by first finding all switches in SCUCT 68 to which the control unit is attached and then taking the union of all CHPIDs attached to those switches from SCCT 67. Together tables 67 and 68 permit the system to find or locate a CHPID in pool 45 that may be selected for connection to a control unit connected to the same switch. SCCT 67 and SCUCT 68 together list all CHPIDS currently configured to a control unit and potentially configurable to a control unit. Inversions of one or both of these tables can also be used. For example, in such a table, a table entry would be indexed by CHPID number and would contain the switch to which that channel path is attached. The means of determining the switch-to-CHPID correspondence and the switch-to-control unit correspondence is a known technique.

Referring back to FIG. 2, statistics collection routine 48 is periodically executed as a task under the control of the operating system to perform the following functions expressed in pseudocode:

```
100   DO every t1 seconds
110     DO for each configured CHPID in CUT 66
120       Store average CHPID utilization over time
          t1 in table 66 of table 50.
125     ENDDO
130     DO for each control unit in CUB 60
135       Calculate and store in corresponding CUB
          entry the total control unit connect time
          for use by alert routine 54 to infer
          contribution to utilization by control
          unit.
140     ENDDO
150   ENDDO
```

A dynamic CHPID monitor routine 52 is executed as a task under the control of the operating system every t2 seconds or time interval. Such routine examines CHPID utilizations in table 66 and for each CHPID determines if the utilization exceeds a threshold level T. If the utilization exceeds such threshold, the CHPID is added to alert CHPID list 53. If the utilization does not exceed the threshold, the next CHPID is examined, and so on until all CHPIDs have been monitored. If no CHPID was added to list 53, the routine ends. If one or more CHPIDs was added to list 53, then CHPID alert routine 54 is called. The functions of CHPID monitor routine 52 expressed in pseudocode are as follows:

```
100   DO every t2 seconds
110     DO for every CHPID in table 66
120       IF CHPID utilization in CUT 66 >
          threshold T
130         Add CHPID to alert CHPID list 53
140       ENDIF
150     ENDDO
160     IF there is any CHPID in list 53
170       THEN CALL CHPID alert routine 54.
180     ENDIF
190   ENDDO
```

In the following example, reconfiguration manipulates the channel utilizations in units of a minimum of D where D is a unit measure of bandwidth utilization. CHPID alert routine 54 examines each alert CHPID in list 53 and determines appropriate reconfiguration actions needed in accordance with the following pseudocode:

```
100   DO for each alert CHPID in list 53
110     Determine the most significant CHPID control
        unit (SCU)
120     IF SCU not already processed
130       IF SCU does not have maximum number of
          CHPIDs configured
140         Find CHPID with minimum utilization in
            SCU CHPID pool 45 not already
            configured to SCU
150         IF found CHPID utilization < T − D
160           Call DI/OR routine to add found
              CHPID to SCU
165           Temporarily add apportionment of
              SCU utilization to new CHPID
170           Indicate reconfiguration done
180         ENDIF
190       ELSE the SCU already has maximum
          number of CHPIDs configured
200         DO for each CHPID currently
            configured to SCU
210           DO for each control unit (CU) on
              selected CHPID except SCU
220             U=CU utilization on selected
                CHPID
230             IF U > D
240               DO for each CHPID in CU
                  CHPID pool which is not
                  currently configured to CU
                  or SCU
250                 IF CHPID
                    utilization < T-U
260                   CALL DI/OR to
                      deconfigure CU
                      from SCU CHPID
                      and configure CU
                      to CHPID
265                   Temporarily add U
                      to utilization of new
                      CHPID
270                   Indicate
                      reconfiguration
                      done
280                   LEAVE LOOP
290                 ENDIF
300               ENDDO
305             ENDIF
310             IF reconfiguration done
320               LEAVE LOOP
330             ENDIF
```

```
                       -continued
340              ENDDO
350          IF reconfiguration done
360              LEAVE LOOP
370          ENDIF
380        ENDDO
390      ENDIF
400    ENDIF
410    IF no reconfiguration done
420        Examine workload goals and evaluate
           tradeoffs.
430    ENDIF
440 ENDDO
```

Line 110 immediately above refers to an SCU. This is the control unit which most contributes to the CHPID utilization based on the collected statistics, i.e., the control unit on that CHPID which has the maximum value of total connect time in CUB entry divided by the number of paths to which CU is currently configured. Alternatively, the SCU could be the control unit causing delays to the most important work in the system specified by the installation. The intent of line 120 is to ensure that a control unit is involved in at most one reconfiguration per time period t2 and avoid over adjustments in response to a single problem. If the SCU has already been processed, control branches to line 400. Lines 130-180 handle the case where the SCU can have an additional CHPID configured to it. CHPID utilization is managed attempting to free a minimum of D utilization or find a CHPID with a minimum of D utilization below the threshold T. If a CHPID in the CHPID pool can be found with sufficient available utilization, then that CHPID is configured to the control unit. The CHPID with the most available utilization is always selected. If there are no such CHPIDs in the CHPID pool, no action is taken. Alternatively, additional algorithms can be used in which other aspects of the configuration are modified to either find an additional CHPID with sufficient available capacity, moving a control unit configured with the SCU to a different CHPID or completely dropping it from one of the CHPIDs, etc. The purpose of line 165 is to take into account the fact that more work is being placed on a new CHPID and avoid future iterations through the loop from overloading this CHPID. The apportionment is computed by taking the total SCU utilization across all its original CHPIDs divided by the new number of 15 CHPIDs after configuring the new CHPID to the SCU.

Lines 200-300 address the case where the SCU is already fully configured. In such situation, some other control unit configured to the SCU CHPIDs must be moved somewhere else or dropped completely from one or more of the CHPIDs. Again, more complicated manipulations can be used in which the entire configuration is modified to make more utilization available on the SCU CHPIDs. For example, if no single control unit can be found which satisfies the requirement on line 230 of utilizing at least D, two or more control units whose utilization together exceed D can be selected. The purpose of line 265 is to take into account the fact that work is being placed on a new CHPID and avoid future iterations through the loop from overloading this CHPID. The utilization of the SCU CHPID is not reduced for these calculations because the objective is to free capacity for the SCU, we do not want to indicate excess utilization is available; it would be possible to subtract at most D if we wanted to manage as closely as possible to increments of D.

Lines 410-430 simply suggest the possibility of sacrificing one control unit's performance for another in cases where no reconfiguration could be found, based on most closely satisfying the objectives of the installation. It is also possible to apply algorithms to individual I/O devices rather than to an entire control unit. For example, access to a single device can be excluded on a CHPID, freeing capability on that CHPID. This does not require calling the DI/OR routine since the control unit must remain configured to the CHPID for the remaining devices. Such exclusion can be accomplished by causing the channel subsystem to not use the designated CHPID(s) for a particular device, using the previously described LPM in the SCHIB associated with the device. That is, the LPM bit corresponding to a CHPID can be 15 set to zero thereby disabling or preventing the use of such CHPID for the device. Such exclusion can be done by first determining which I/O device has the greatest connect time and then disabling the CHPID associated with such I/O device. Such action has the effect of freeing up the path for use by other devices while disabling use of an exceptionally busy device. This mechanism can also be applied to physical configurations which do not provide programmable switches so that the CHPID pool consists solely of the paths to which the control unit has been physically attached.

A CHPID failure alert routine 56 is called when the software is notified of a CHPID failure. When a CHPID fails, it must be removed from the definitions of all attached control units and devices. Later, if utilization levels dictate, new CHPIDs can be switched in. Routine 56 simply calls DI/OR 34 to remove the failed CHPID from a control unit and from all devices on that control unit. When the DI/OR is invoked to add or delete a CHPID from a control unit, CUB 60 is updated to reflect such change.

EXAMPLE

It is assumed for the purposes of this example that reconfiguration manipulates bandwidth in units of D<T. Table 1 illustrates configuration changes over a period of changing workload. The PATH row in Table 1 sets forth the respective channel paths from CSS 16 to the control units. The CONFIG.I row sets forth an initial example configuration indicating which control units (CU) shown in FIG. 1 are defined to which respective channel paths or CHPIDs. Initially, the configuration of the channel paths supports the work of the control units such that each path sustains a utilization of W where 0<W<T, and each control unit is attached through two CHPIDs, one through each switch. For example, CUI is attached via paths P0 and P4.

TABLE 1

| PATH | P0 | P1 | P2 | P3 | P4 | P5 | P6 | P7 |
|---|---|---|---|---|---|---|---|---|
| CONFIG.I | CU1 | CU2 | CU3 | CU4 | CU1 | CU2 | CU3 | CU4 |
| T0 WORKLOAD | W | W | W | W | W | W | W | W |
| T1 WORKLOAD | W | W | W | >T | W | W | W | >T |
| CHANGE.I | CU1,4 | CU2 | CU3 | CU4 | CU1 | CU2 | CU3 | CU4 |
| T2 WORKLOAD | >T | W | W | >T | W | W | W | >T |
| CHANGE.II | CU1,4 | CU2,4 | CU3 | CU4 | CU1 | CU2 | CU3 | CU4 |

TABLE 1-continued

| PATH | P0 | P1 | P2 | P3 | P4 | P5 | P6 | P7 |
|---|---|---|---|---|---|---|---|---|
| T3 WORKLOAD | >T | >T | W | >T | W | W | W | >T |
| CHANGE.III | CU4 | CU2,4 | CU1,3 | CU4 | CU1 | CU2 | CU3 | CU4 |
| T4 WORKLOAD | W | W | W | W | W | W | W | W |

The T0 WORKLOAD row indicates all paths are currently below the threshold which would place them in a utilization alert state. Suppose at time T1, CU4 experiences an increase in workload, as shown in row T1 WORKLOAD, which causes P3 and P7 to each exceed the utilization threshold T and enter an alert state. This utilization state is detected by routine 52 (lines 130-180)in which CU4 is found to be the SCU. As a result, the configuration is changed by configuring CU4 to path P0 as shown in row CHANGE.I. P0 is now shared by CU1 and CU4. As a result of this change, CU4 has more bandwidth available to it thus decreasing utilization on P3 and P7. Next, suppose that CU4 is still exceeding the threshold utilization of paths P3 and P7 and has increased utilization on path P0 beyond the threshold T in the T2 WORKLOAD. The system detects this increase and provides additional bandwidth to CU4 by reconfiguring the system so that path P1 is driven by both CU4 and CU2 as indicated by the CHANGE.II row. Note that with such change, there are now four paths defined to CU4 and four is the maximum number of paths a control unit can handle in this example and is therefore fully configured.

Next, assume the workload on CU4 further increases as indicated by the T3 WORKLOAD so that each path is driven beyond the threshold. Since CU4 is fully configured with four paths, no additional path can be switched in. A configuration CHANGE.III is made during which lines 190-380 are executed and another control unit on one of the other paths currently configured to CU4, is moved to another path not currently configured to CU4. In CHANGE.III, CU1 is switched from path P0 to path P2 which it shares with CU3, and CU4 has path P0 to itself. Also with such change, the channel path comprising P0 to CU1 is deconfigured and placed in the pool of potentially configurable CHPIDs. Finally, assume the system reaches a steady state T4 WORKLOAD where no path exceeds the utilization threshold T. This steady state workload is transient and indicates no further configuration changes are needed.

The values of t1, t2, T, and D are preferably under the control of a system programmer thereby allowing the customer to change such values in accordance with different workloads. It is anticipated that the exact values used may have to be adjusted to achieve the best performance.

It should be obvious to those skilled in the art that extensions can be made to data structure 50 to handle cases when a device is attached to multiple control units that in turn may be attached to multiple switches. It should also be apparent to those skilled in the art that many changes can be made in the details and arrangements of steps and parts without departing from the scope of the invention as defined in the appended claims.

What is claimed is:

1. A data processing system (DPS) comprising;
    a main storage for storing application programs, multitasking operating system programs, and channel programs;
    a central processing unit (CPU) connected to said main storage for concurrently executing said application programs and said operating system programs;
    a channel subsystem connected to said CPU and to said main storage for executing said channel programs, in response to input/output (I/O) commands from said CPU, and transferring data to and from said main storage;
    I/O means connected to said channel subsystem and comprising a plurality of I/O devices, a plurality of control units connected to said I/O devices for controlling operation of said I/O devices, and a plurality of channel paths connected between said channel subsystem and said control units;
    configuring means defining a channel path configuration comprising channel paths that are currently configured;
    first means automatically operated by said operating system at periodic first intervals for measuring usage of said I/O means and storing measurement data indicative of such usage;
    second means automatically operated by said operating system at periodic second intervals for analyzing said measurement data and determining when such usage exceeds a predetermined threshold;
    third means selectively operated by said second means, when such usage is determined to exceed said predetermined threshold, for indicating what channel path change should be made in said channel path configuration to reduce usage in said I/O configuration below said predetermined threshold; and
    fourth means for dynamically changing said channel path configuration by altering said configuring means to define said channel path change as being currently configured.

2. A DPS in accordance with claim 1 comprising a plurality of dynamic switches connected in said channel paths between said channel subsystem and said control units, each switch having a plurality of ports connected to a first plurality of paths connected between such switch and said channel subsystem, each switch further having a plurality of ports connected to a plurality of second paths connected between such switch and a plurality of control units, each switch being selectively operable to connect any one of said first paths connected thereto to any one of said second paths connected thereto, whereby each channel path includes one of said first paths, one of said switches, and at least one of said second paths.

3. A DPS in accordance with claim 2 wherein;
    said second means comprises first storage means for storing a pool of channel path identifiers that identify channel paths that are potentially configurable into said channel path configuration;
    said third means being operative to indicate that said channel path change comprises a first channel path selected from said pool;
    and said fourth means is operative to dynamically change said channel path configuration by configuring said first channel path so selected into said channel path configuration.

4. A DPS in accordance with claim 2 wherein:

said first means is operative to measure connect times during which said control units communicate with said channel subsystem and said I/O devices are connected to channel paths, said connect times being utilization information stored as part of said measurement data said of such connect times;

and said second means analyzes said utilization information to determine when utilization of a channel path, as indicated by connect time, exceeds said predetermined threshold.

5. A DPS in accordance with claim 4 wherein said third means accesses said utilization information and determining which one of said control units most contributed to utilization of said channel path whose utilization exceeds said predetermined threshold.

6. A DPS in accordance with claim 5 wherein:

said fourth means comprises a callable dynamic I/O reconfiguration routine for configuring said first channel path and said one control unit;

said third means comprises a callable alert routine for selecting said first channel path and determining said one control unit and calling said dynamic I/O reconfiguration routine; and said second means comprises a monitoring routine for accessing said utilization information and calling said alert routine in response to a determination that a channel path is being used in excess of said threshold.

7. A DPS in accordance with claim 6 comprising:

data structure means for storing all of said utilization information and comprising a first table for storing channel path utilization, a second table for storing control unit utilization, and a third table for storing I/O device utilization, said first, second and third tables being written into by aid first means and being read from by said second means and said third means.

8. A DPS in accordance with claim 5 wherein:

each control unit can be configured with a predetermined maximum number of channel paths;

and said one control unit is configured to said first channel path when the number of channel paths already configured to said one control unit is less than said maximum number.

9. A DPS in accordance with claim 5 wherein:

each control unit can be configured with a predetermined maximum number of channel paths;

and said one control unit is selected by first accessing said utilization information and determining which control unit most contributed to utilization of said channel path whose utilization exceeds said threshold, by secondly determining if such control unit is fully configured with said maximum number of channel paths, and by thirdly deconfiguring a channel path from such control unit and configuring said first channel path to such control unit, when such control unit is fully configured.

10. A DPS in accordance with claim 1 wherein said fourth means is operative to dynamically change said channel path configuration by disabling a channel path to a particular I/O device.

11. A DPS in accordance with claim 10 comprising:

a subchannel associated with each I/O device, each subchannel comprising a list of channel paths configured with said associated device, each subchannel further comprising a logical path mask for selectively enabling and disabling channel paths in such list, whereby said associated device can be disabled on its associated channel path by setting said logical path mask.

12. A DPS in accordance with claim 11 wherein said utilization information includes connect times during which said I/O devices are used to transfer information;

and said third means is operative to determine which I/O device has the greatest connect time and to prevent use of the device having the greatest connect time by disabling one of more channel paths configured to such I/O device.

13. The method of operating a data processing system (DPS) comprising a main storage for storing application programs, multitasking operating system programs, and channel programs; a central processing unit (CPU) connected to said main storage for concurrently executing said application programs and said operating system programs; a channel subsystem connected to said CPU and to said main storage for executing said channel programs in response to input/output (I/O) commands from said CPU and transferring data to and from said main storage; and I/O configuration connected to said channel subsystem and comprising a plurality of I/O devices, a plurality of control units connected to said I/O devices for controlling operation of said I/O devices, and a plurality of channel paths connected between said channel subsystem and said control units; and configuring means defining a first set of channel paths that are currently configured; said method being performed by said DPS and comprising:

(a) automatically measuring usage of said I/O means at periodic first intervals and storing measurement data indicative of such usage;

(b) aromatically analyzing said measurement data and determining when such usage exceeds a predetermined threshold;

(c) indicating, when such usage is determined to exceed said predetermined threshold, what channel path change should be made in said channel path configuration to reduce usage in said I/O configuration below said predetermined threshold; and (d) dynamically changing said channel path configuration in accordance with the channel path change indicated in step (c).

14. A method of operating a DPS in accordance with claim 13 wherein said DPS further comprises a plurality of dynamic switches connected in said channel paths between said channel subsystem and said control units, each switch having a plurality of ports connected to a first plurality of paths connected between such switch and said channel subsystem, each switch further having a plurality of ports connected to a plurality of second paths connected between such switch and a plurality of control units, each switch being selectively operable to connect any one of said first paths connected thereto to any one of said second paths connected thereto, whereby each channel path includes one of said first paths, one of said switches, and at least one of said second paths.

15. A method of operating a DPS in accordance with claim 14 comprising:

(e) storing a plurality of channel path identifiers that identify a second set of channel paths that re potentially configurable into said I/O configuration;

step (c) comprises selecting a first channel path from said second set; and a step (d) comprises configuring said first channel path selected by step (c) into said first set.

16. A method of operating a DPS in accordance with claim 15 wherein:

step (a) further measures utilization of said channel paths in terms of connect times during which said control units communicate with said channel subsystem sand said I/O devices are connected to channel paths, and stores utilization information indicative thereof;

step (b) determines from said utilization information if any channel path has been used in excess of a threshold level;

step (c) selects said one control unit by accessing said utilization information and determining which control unit most contributed to utilization of said channel path whose utilization exceeds said threshold level; and step (d) dynamically changes said I/O configuration by configuring said first channel path to one of said control units when a channel path has been used in excess of said threshold level.

17. A method of operating a DPS in accordance with claim 16 wherein;

step (b) comprises executing a monioring routine for accessing said first mentioned utilization information and calling an alert routine in response to a determination that a channel path is being used in excess of said threshold level;

step (c) comprises executing said alert routine when called by said monitoring routine, to select said first channel path and determine said one control unit, and to call a dynamic I/O reconfiguration routine;

and step (d) comprises executing said dynamic I/O reconfiguration routine when called by said alert routine, for configuring said first channel path and said one control unit.

18. A method of operating a DPS in accordance with claim 17 comprising:

storing all of said utilization information in said main storage as a data structure comprising a first table containing channel path utilization and a second table containing control unit utilization.

19. A method of operating a DPS in accordance with claim 16 wherein each control unit can be configured with a predetermined maximum number of channel paths;

and configuring said one control unit to said first channel path when the number of channel paths already configured to said one control unit is less than said maximum number.

20. A method of operating a DPS in accordance with claim 16 wherein each control unit can be configured with a predetermined maximum number of channel paths;

and selecting said one control unit by first accessing said utilization information and determining which control unit most contributed to utilization of said channel path whose utilization exceeds said threshold level, by secondly determining if such control unit is fully configured with said maximum number of channel paths, by thirdly identifying a second control unit which shares at least one path with such control unit, by fourthly identifying a first channel path which such control unit shares with said second control unit and a second channel path which such control unit does not share with said second control unit, and by fifthly deconfiguring said first channel path from said second control unit and configuring said second channel path to said second control unit when said one control unit is fully configured.

21. A method of operating a DPS in accordance with claim 14 to dynamically change said channel path configuration by disabling a channel path to a particular I/O device.

22. A method of operating a DPS in accordance with claim 21 comprising:

storing in said channel subsystem a subchannel associated with each I/O device, each subchannel comprising a list of channel paths configured with said associated device, each subchannel further comprising a logical path mask for selectively enabling and disabling channel paths in such list.

23. A method of operating a DPS in accordance with claim 22 wherein said information includes connect times during which said I/O devices are used to transfer information;

and step (b) comprises determining which I/O device has the greatest connect time and preventing use of the I/O device having the greatest connect time by disabling one or more channel paths configured to such I/O device.

* * * * *